(12) United States Patent
Fliege et al.

(10) Patent No.: US 6,561,564 B1
(45) Date of Patent: May 13, 2003

(54) TARPAULIN STRUCTURE

(75) Inventors: Dieter Fliege, Remscheid (DE); Josef Drasch, Winzer (DE); Roger Remmel, Remscheid (DE)

(73) Assignee: Edscha LKW-Schiebeverdecke GmbH, Remscheid (DE)

( * ) Notice: Subject to any disclaimer, the term of this patent is extended or adjusted under 35 U.S.C. 154(b) by 0 days.

(21) Appl. No.: 09/786,143

(22) PCT Filed: Sep. 1, 1999

(86) PCT No.: PCT/DE99/02821

§ 371 (c)(1),
(2), (4) Date: Jul. 3, 2001

(87) PCT Pub. No.: WO00/12334

PCT Pub. Date: Mar. 9, 2000

(30) Foreign Application Priority Data

Sep. 1, 1998 (DE) .......................................... 198 39 775

(51) Int. Cl.⁷ .................................................. B60P 7/02
(52) U.S. Cl. ............................. 296/100.12; 296/100.11; 296/100.01
(58) Field of Search ....................... 296/100.12, 100.11, 296/100.01

(56) References Cited

U.S. PATENT DOCUMENTS 5,658,037 A * 8/1997 Evans et al. ............. 296/100.12
5,951,092 A * 9/1999 Cissell ................... 296/100.12

FOREIGN PATENT DOCUMENTS

| CH | 136218 | 10/1929 | | |
|---|---|---|---|---|
| EP | 0459879 | | 12/1991 | ............... B60J/7/06 |
| EP | 0459879 A1 | * | 12/1991 | ............ 296/100.12 |
| FR | 2162703 | | 7/1973 | ............... B60P/7/00 |
| FR | 2610574 A1 | * | 8/1988 | ............ 296/100.12 |
| WO | WO-9119625 | * | 12/1991 | ............ 296/100.01 |
| WO | 9732745 | | 9/1997 | ............... B60J/7/06 |

* cited by examiner

Primary Examiner—D. Glenn Dayoan
Assistant Examiner—Lori L Coletta
(74) Attorney, Agent, or Firm—Davidson, Davidson & Kappel, LLC

(57) ABSTRACT

The invention relates to a tarpaulin structure for the bodies of motor vehicles and containers, comprising a tarpaulin frame that covers the entire length of the loading compartment, is provided with upper longitudinal fascias and is supported against the body of the motor vehicle by protruding supporting elements. At least one tarpaulin that covers the roof area of the top is supported by bows (8) that are supported on both ends by rollers (6), whereby the bows can slide in a longitudinal direction of the motor vehicle, on the longitudinal fascias (4) of the tarpaulin frame. The neighboring bows (8) are joined to each other in the region of both longitudinal sides of the tarpaulin by a bearing element (9) for the tarpaulin, whereby a reduced distance between both adjacent bows (8) results in the tarpaulin being folded between the adjacent bows in an upwards direction. A tarpaulin structure that enables the bearing elements to be joined to the bows or rollers in a simple manner is achieved by joining the rollers (6) to both the bearing elements (9) for the tarpaulin and to the shafts on the bows (8) so that they engage with each other in an exclusive manner in mutual positive fit.

13 Claims, 4 Drawing Sheets

TARPAULIN STRUCTURE

BACKGROUND OF THE INVENTION

The present invention relates to a tarpaulin structure for vehicle bodies and containers, having a folding-top frame which covers the length of the loading compartment having upper longitudinal flanges supported on the vehicle chassis via protruding supports, wherein a tarpaulin, which at least fits over the roof region of the folding top, is supported by bows which are supported at both ends by means of roller carriages in a manner allowing them to be displaced in the longitudinal direction of the vehicle on the longitudinal flanges of the folding-top frame, and wherein mutually adjacent bows are connected to one another in the region of both longitudinal sides of the folding top in each case by means of a bearing element for the tarpaulin in such a manner that a reduction in the distance between two adjacent bows results in upwardly directed folding of the tarpaulin between the adjacent bows.

Swiss Patent Application No. 136 218 describes a folding top wherein the bows supporting the folding-top tarpaulin are connected to one another along both longitudinal sides of the folding top via bearing elements for the roof tarpaulin, the said bearing elements being formed by longitudinal sections of a flat strip material made of semi-rigid material and essentially being arranged congruently to the upper longitudinal flanges of the folding-top frame, the sections of strip material being fastened at their two ends in a non-detachable manner to adjacent bows in each case by means of rivets and being provided with marked lines of articulation. When the folding top is pushed together, as a consequence of the reduction in distance between adjacent bows the sections of strip material fold upwards and therefore cause folding of the folding-top tarpaulin. The lines of articulation of the bearing elements are aligned parallel to one another and perpendicular with respect to the longitudinal extent of the upper longitudinal flanges of the folding-top frame. In order to produce a connection between the bearing elements, which are formed from semi-rigid material, and the bows a considerable technical and financial outlay is required.

French Patent Application No. 2 162 703 describes a folding top, which can be pushed together, for motor vehicles, wherein to eliminate the problem of the roof tarpaulin dragging on or becoming jammed on the upper longitudinal flanges of the folding-top frame it is proposed to fasten a strip of semi-rigid material to angled portions of the bows, which angled portions are assigned to the side regions of the folding top and are directed downwards, which strip forces the folds of the folding-top tarpaulin to be ejected in an outwards direction as the folding top is being pushed together and is therefore intended to prevent damage to the tarpaulin during opening and closing of the folding top. In order to produce a connection between the bearing elements formed from semi-rigid material and the bows, a considerable technical and financial outlay is required.

SUMMARY OF THE INVENTION

According to an earlier proposal of the applicant which is unpublished at the priority date of the present invention, it has been suggested to permanently fasten the bearing elements consisting of semi-rigid material by means of retaining plates and rivets not to the bows, but to the roller carriages which support the bows on the longitudinal flanges of the folding-top frame and, for their part, can be produced in a complicated manner as special parts. In order to relieve the load on the fastening means, in particular rivets, which connect the bearing elements to the bows, abutments on each bow which are aligned transversely to the longitudinal extent of the bearing elements are assigned to the ends of the bearing elements, with the result that the tensile and compressive forces arising from the deflections of the bearing elements during the opening and closing of the folding top are absorbed by the abutments, and the fastening means are thereby kept free of such forces, in order to prevent the bearing elements from being torn out in the region of the fastening means.

It is an object of the present invention to propose a tarpaulin structure, which makes simple connection of the bearing elements to the bows or to the roller carriages possible.

In the case of the tarpaulin structure which is mentioned at the beginning, this object may be achieved in that the roller carriages are connected at one end to the bearing elements for the tarpaulin and at the other end to bow shafts of the bows exclusively via mutual, form-locking engagement.

The exclusive connection according to the invention of all parts of a bow and at the same time also of the bearing elements via form-locking engagement renders superfluous through-going fastening means, such as screws or rivets, which are to be used as individual parts, and leads to a reduction in the required outlay on production. Production of the bows is thereby made altogether less expensive. In addition, the bow and roller carriage and also bearing element design, which according to the invention renders special fastening means superfluous, leads to a reduction in the individual parts required as a whole while simultaneously and advantageously providing an option for compensating for different bow lengths. Furthermore, the form-locking connection of the roller carriage to the bearing elements at one end and to the bow shafts at the other end provides a connection which can be dismantled with little outlay and permits rapid exchange of the roller carriage if, for example, damage to the bearing of the supporting roller requires this. The non-defective parts can then be reused.

In a preferred embodiment of a roller carriage which can be connected to a shaft part of a bow, which shaft part is formed by a simple hollow-profile section, provision is made for the chassis of the roller carriage to be of two-part design, and for the two parts of a roller carriage to be connected to each other by mutual, form-locking engagement. In this connection, the one part is designed for gripping around the upper longitudinal flange, and in particular is formed with rollers for moving it along runners provided in the longitudinal flange. The other part is used for the connection to the shaft part of the bow, and one of the two parts or both parts together preferably hold the ends of the bearing elements.

In an expedient design, provision is made for a first part of the roller-carriage chassis to be formed by a sheet-metal shaped part which grips like a bracket around the runner of the upper longitudinal flange of the folding-top frame and supports the supporting rollers and guide rollers of the roller carriage, and for a second part of the roller-carriage chassis to be formed by a sheet-metal folded part which grips, by means of its free ends, in a partial and tongs-like manner around the first part of the roller carriage and engages, by means of an engagement region of U-shaped configuration in horizontal projection, in the hollow profile of the bow shaft. An exclusively form-locking connection initially between the two parts of the roller-carriage chassis is advantageously achieved in that the sheet-metal folded part which grips around in a tongs-like manner grips with a first arm over the profiled base and with a second arm over the limb, which lies on the inside with respect to the folding top, of the bracket-shaped, first part of the roller-carriage chassis. Simple assembly and easy dismantlability again are preferably ensured in that the sheet-metal folded part which grips around in a tongs-like manner is provided at the free ends of its two arms with a respective bent-over edge, the edges engaging in correspondingly designed slots or projections of the first part. In this case, the form-locking engagement can be broken off again by bending the second part.

The second part preferably engages with its bent-over edge, which is arranged on the first arm, in a slotted recess in the profiled base of the bracket-shaped, first part of the roller-carriage chassis, while its bent-over edge, which is arranged on its second arm, grips around the free edge of the limb, which lies on the inside with respect to the folding top, of the bracket-shaped first part of the roller-carriage chassis. Since the tongs-like, second part of the roller-carriage chassis is designed at one end as a sheet-metal folded part and is therefore of resilient design to a certain extent at least in its U-shaped engagement region, the two arms of the second part, which arms partially grip around the bracket-shaped first part, are forcibly moved towards each other as the engagement region of the second part is introduced into the hollow-profile section forming the shaft part of the bow, and the form-locking engagement of the bent-over edges of the free ends of its two arms to the mating forms on the first bracket-shaped part of the roller-carriage chassis is therefore secured.

For the form-locking connection of the supporting parts of the support for the tarpaulin of a tarpaulin structure, provision is furthermore expediently made for bearing elements which connect the adjacent bows and roller carriages to one another and consist in each case of a strip of semi-rigid material to rest with their end regions on the bracket-shaped, first part of the roller-carriage chassis, in each case extending over part of its width and length, and to be supported both in the longitudinal direction and in the transverse direction of the roller-carriage chassis on regions, which have been bent out upwards, of the profiled base of the bracket-shaped, first part of the roller-carriage chassis. When the roller carriages are moved, bringing about a reduction in the distance between two roller carriages, the bearing element, which is provided between the two roller carriages and is held on them, is bent upwards together with the tarpaulin laid on it.

A correct, mutual arrangement of bearing elements and roller-carriage chassis is preferably secured by those end regions of the bearing elements, consisting of strips of semi-rigid material, which rest on the profiled base of the bracket-shaped, first part of the roller-carriage chassis being gripped over by the first arm of the sheet-metal folded part which grips around in a tongs-like manner. Apart from a form-locking support in the longitudinal and transverse directions and clamping by the first arm of the sheet-metal folded part which grips around in a tongs-like manner, it is additionally possible, as regards the connection of the bearing elements to the bows and roller carriages, to bring the bearing elements, which consist of strips of semi-rigid material, by means of recesses formed in their end regions resting on the profiled base of the bracket-shaped, first part of the roller-carriage chassis, into form-locking engagement with reliefs which are of complementary configuration, are cut out from the profiled base of the bracket-shaped, first part of the roller-carriage chassis and point upwards. In this connection, either just one bearing element or else also a recess in the first arm of the second part can be penetrated by the reliefs.

All in all, the above-illustrated manner of connecting the bearing elements to the roller carriages has the aim that at one end the recesses which are provided in those end regions of the bearing elements which rest on the profiled base of the bracket-shaped, first part of the roller-carriage chassis are in form-locking engagement with upwardly pointing reliefs of the profiled base of the bracket-shaped, first part of the roller-carriage chassis, and at the other end the longitudinal and transverse edge regions of those end regions of the bearing elements which rest on the profiled base of the bracket-shaped, first part of the roller-carriage chassis are simultaneously and forcibly held in form-locking engagement, both in the longitudinal direction and in the transverse direction of the roller-carriage chassis, on those regions of the profiled base of the bracket-shaped, first part of the roller-carriage chassis which are bent out upwards by means of the first arm of the sheet-metal folded part which grips around in a tongs-like manner, which arm grips over the regions.

In order to produce a connection between the roller carriage and hollow-profile section forming the shaft part of a bow, provision is preferably made for the engagement region, which is of U-shaped configuration in horizontal projection, of the second part, formed for example by a tongs-like sheet-metal folded part, of the roller-carriage chassis to be secured in its engagement position in the hollow profile of the bow shaft by means of a spring plug or a simple pin which grips, by means of its plug pin, simultaneously through a recess in at least one angled portion of the one profiled limb of the engagement region, which angled portion at least partially grips over the region between the two profiled limbs of the engagement region, and through hole recesses in the mutually opposite profiled walls of the hollow profile forming the shaft part of the bow. This plug-in connection produces a reliable form-locking engagement and, moreover, can easily be detached again.

A multiplicity of hole recesses assigned to a spring plug or pin is preferably provided in that longitudinal section of a hollow profile which forms the bow shaft, successively in the longitudinal direction thereof. This preferred design of the connection between the roller carriages and the hollow profile forming the shaft part of the bow opens up the possibility of connecting the roller carriages to the shaft part of the bow in such a manner that the roller. carriages can be fastened at different distances from their ends to the hollow-profile section forming the bow-shaft part, and therefore bows for different widths of tarpaulin folding tops can be produced using a uniform longitudinal blank of hollow-proof material and roller carriages which are likewise of uniform design.

Further advantages and features of the invention emerge from the following description.

BRIEF DESCRIPTION OF THE DRAWINGS

The present invention is explained in greater detail below using a preferred exemplary embodiment and referring to the attached drawings.

DETAILED DESCRIPTION OF A PREFERRED EMBODIMENT

Figure 1:
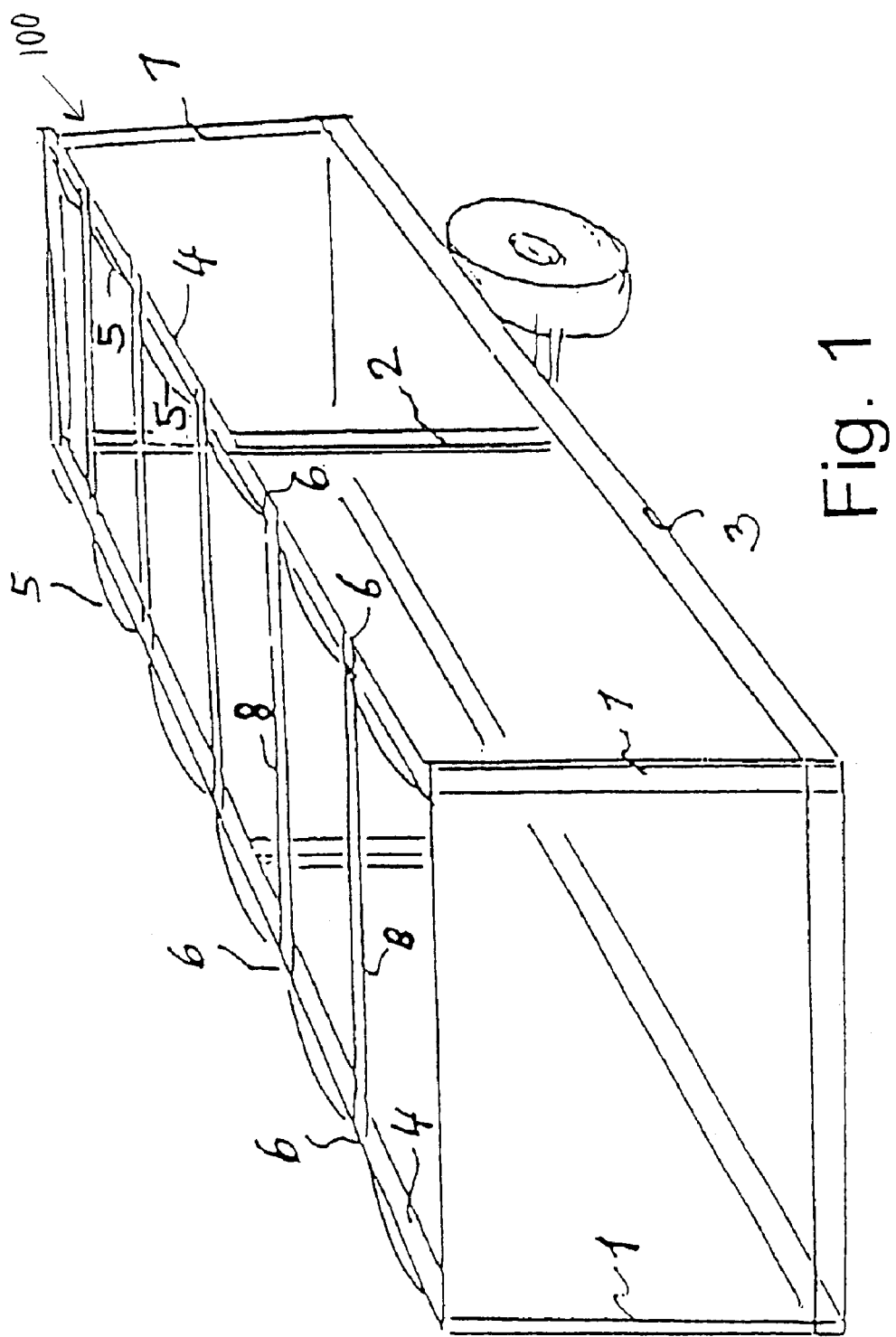
FIG. 1 shows a perspective view of a commercial vehicle equipped with a foldable exemplary embodiment of a tarpaulin structure according to the invention.

The foldable tarpaulin structure which is illustrated schematically in FIG. 1 includes, among other things, a folding-top frame 100 having upper longitudinal flanges 4 which cover the length of the loading compartment and are supported on a vehicle chassis, which is denoted by 3, via protruding supports 1 and stakes 2, in which a tarpaulin 5, which fits at least over the roof region of the folding top, is supported by bows 8 which cover the width of the loading area and are supported by means of roller carriages 6 in a manner allowing them to be displaced in the longitudinal direction of the vehicle on the longitudinal flanges 4 of the folding-top frame. The roller carriages 6 of mutually adjacent bows 8 are connected to one another in the region of both longitudinal sides of the folding top in each case by means of a bearing element 9, consisting of semi-rigid material, for the tarpaulin 5 in such a manner that a reduction in the distance between two adjacent bows 8 and roller carriages 6 results in an upwardly directed folding of the tarpaulin 5 in this region.

Figure 3:
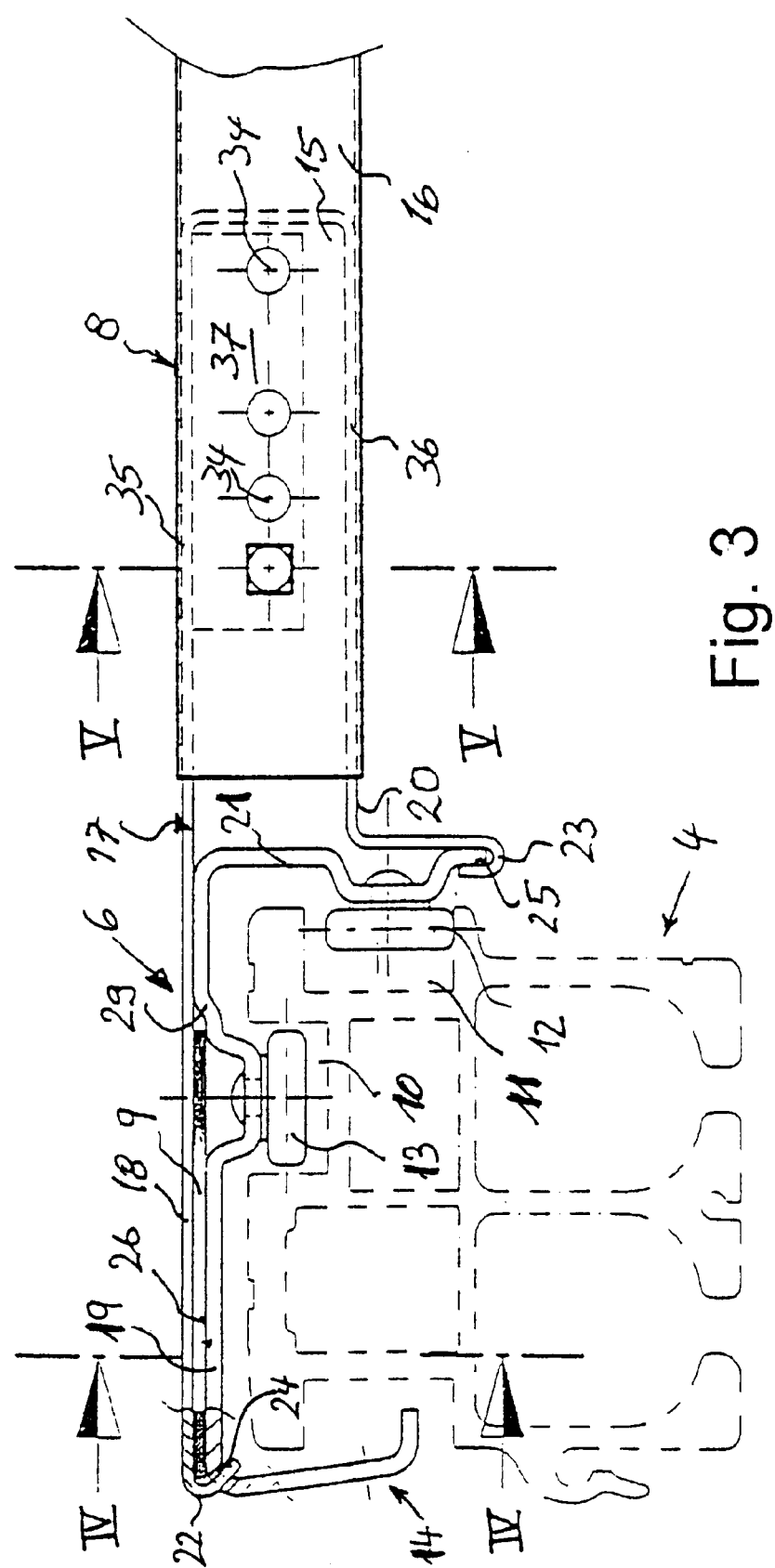
FIG. 3 shows a longitudinal section through the constructional unit comprising the roller carriage and bow from FIG. 2.
Figure 4:
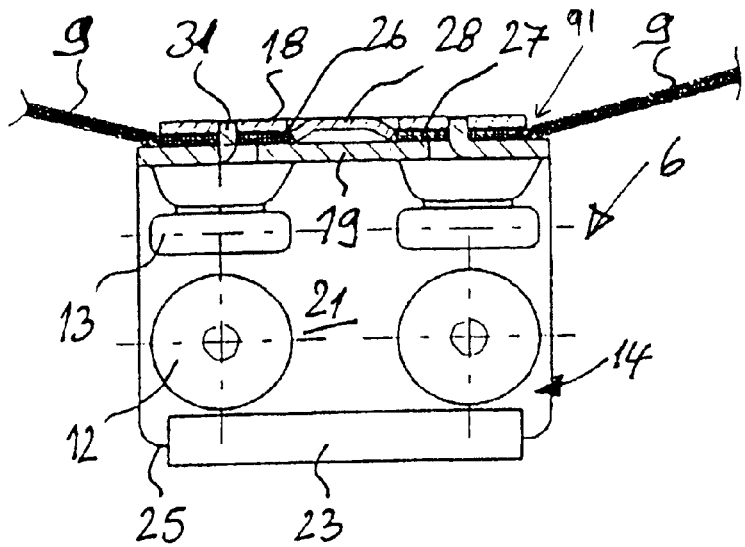
FIG. 4 shows a cross section through the roller carriage along the line IV—IV in FIG. 3.

The chassis of the roller carriages 6 is of two-part design in each case and, as can be seen particularly readily in FIG. 3, comprises a first part 14, which is designed as a sheet-metal shaped part, grips like a bracket around runners 10 and 11 of the upper longitudinal flange 4 of the folding-top frame and supports the supporting rollers 12 and the guide rollers 13 of the roller carriage 6, and a second sheet-metal folded part 17 which grips, by means of its free ends, around the first part 14 in a partial and tongs-like manner and engages, by means of an engagement region 15 of U-shaped configuration in horizontal projection, in the hollow profile 16 of the bow shaft 8.

The tongs-like sheet-metal folded part 17 grips with a first arm 18 over a profiled base 19 and with a second arm 20 over the limb 21, which lies on the inside with respect to the folding top, of the bracket-shaped, first part 14 of the roller-carriage chassis. The tongs-like sheet-metal folded part 17 is provided at the free ends of its two arms 18 and 20 with a respective bent-over edge 22 and 23 and with its bent-over edge 22, which is arranged on the first arm 18, engages in a slotted recess 24 in the profiled base 19 of the bracket-shaped, first part 14 of the roller-carriage chassis. With a bent-over edge 23, which is arranged on its second arm 20, the tongs-like sheet-metal folded part 17 of the roller-carriage chassis grips around the free edge 25 of the limb 21, which lies on the inside with respect to the folding top, of the bracket-shaped, first part 14 of the roller-carriage chassis.

Figure 2:
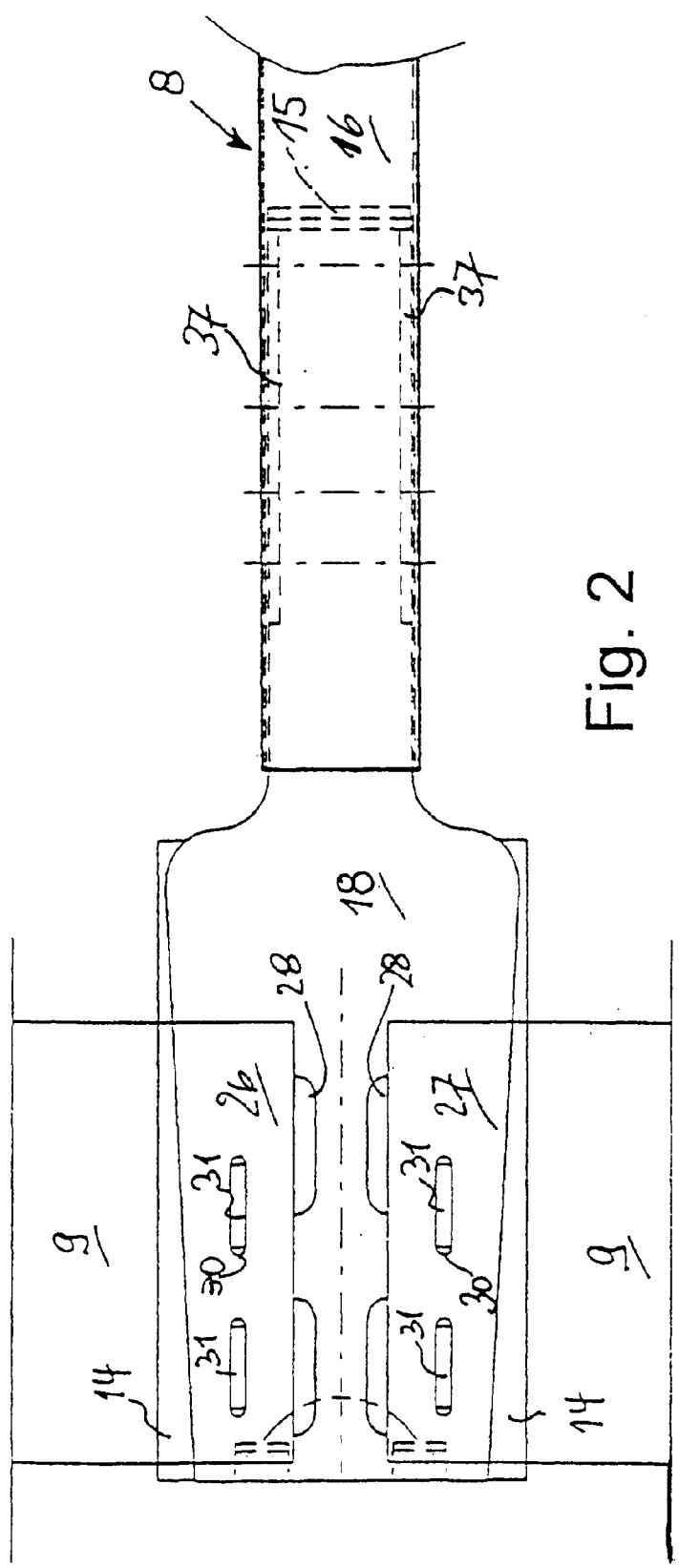
FIG. 2 shows part of a plan view of a bow of the tarpaulin structure from FIG. 1 and also of bearing elements connecting the bow to adjacent bows and of a roller carriage connecting the bearing elements to the bow.

Bearing elements 9 which connect the adjacent bows 8 and roller carriages 6 to one another and consist in each case of a strip of semi-rigid material rest, as can be readily seen in FIG. 2, with their end regions 26 and 27 on the profiled base 19 of the bracket-shaped, first part 14 of the roller-carriage chassis, in each case extending over part of the width and length thereof, and are supported in the longitudinal direction on regions 28, which are bent out upwards, of the profiled base 19. In the transverse direction of the roller-carriage chassis, the end regions 26 and 27 are supported via a shoulder 29 of the profiled base 19. The end regions 26 and 27 which rest on the profiled base 19 are gripped over by the first arm 18 of the sheet-metal folded part 17 which grips around in a tongs-like manner. The bearing elements 9 are additionally provided, in their end regions 26 and 27 which rest on the profiled base 19, with recesses 30 with which reliefs 31 which are of complementary configuration, are cut out from the profiled base 19 and point upwards, are thus in form-locking engagement. The recesses 30, which are provided in the end regions 26 and 27 resting on the profiled base 19 of the bracket-shaped, first part 14, are thus in form-locking engagement at one end with upwardly pointing reliefs 31 of the profiled base 19 and at the other end the longitudinal and transverse edge regions of the end regions 26 and 27 resting on the profiled base 19 are simultaneously and forcibly held in form-locking engagement, both in the longitudinal direction and in the transverse direction of the roller-carriage chassis, on those regions 28 and 29 of the profiled base 19 which are bent out upwards by means of the first arm 18 of the sheet-metal folded part 17 which grips around in a tongs-like manner, which arm grips over the said region. The bearing elements 9 may also have one or two lines of articulation 91 which provide assistance when folding the tarpaulin upward.

Figure 5:
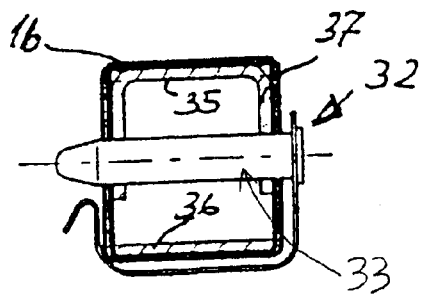
FIG. 5 shows a cross section through the connecting region between the roller carriage and bow along the line V—V in FIG. 3.

The engagement region 15, which is of U-shaped configuration in horizontal projection, of the second part 17, formed by a tongs-like sheet-metal folded part, of the roller-carriage chassis is, as can be readily seen in FIG. 5, secured in its engagement position in the hollow profile 16 of the bow shaft 8 by means of a spring plug 32, the spring plug 32 gripping by means of its plug pin 33, simultaneously through a recess 34 in angled portions 37 of the one profiled limb 35 of the engagement region 15, which angled portions partially grip over the region between the two profiled limbs 35 and 36 of the engagement region 15, and through hole recesses in the mutually opposite profiled walls of the hollow profile 16 forming the shaft part of the bow 8. The angled portions 37, which are positioned perpendicularly with respect to the upper profiled limb 35 of the U-shaped engagement region 15 and partially engage over the region between the two profiled limbs 35 and 36 of the engagement region 15, are advantageously provided with a multiplicity of recesses 34 arranged in a row one behind another, in order to be able to fasten the roller carriages 6 at different distances from their ends to the hollow-profile section 16 forming the bow-shaft part.

What is claimed is:

1. A tarpaulin structure for vehicle bodies and containers comprising:
   a folding-top frame covering a length of a loading compartment and being supported on a vehicle chassis via protruding supports and having upper longitudinal flanges;
   a tarpaulin which at least fits over a roof region of said folding-top frame, the tarpaulin being supported by a plurality of bows supported by means of a roller carriage in a manner allowing the bows to be displaced in the longitudinal direction on said longitudinal flanges,
   wherein two adjacent bows of said plurality of bows are connected to one another by means of a bearing element for said tarpaulin in such a manner that a reduction in a distance between said two adjacent bows results in an upwardly directed folding of said tarpaulin between said two adjacent bows;
   and wherein the roller carriage is connected via mutual, form-locking engagement to said bearing element.

2. A tarpaulin structure for vehicle bodies and containers comprising:

a folding-top frame covering a length of a loading compartment and being supported on a vehicle chassis via protruding supports and having upper longitudinal flanges;

a tarpaulin which at least fits over a roof region of said folding-top frame, the tarpaulin being supported by a plurality of bows supported by means of a roller carriage in a manner allowing the bows to be displaced in the longitudinal direction on said longitudinal flanges, wherein two adjacent bows of said plurality of bows are connected to one another by means of a bearing element for said tarpaulin in such a manner that a reduction in a distance between said two adjacent bows results in an upwardly directed folding of said tarpaulin between said two adjacent bows;

wherein the roller carriage is connected via mutual, form-locking engagement to said bearing element, and wherein a chassis of said roller carriage is of two-part design, and said two parts are connected to each other by a mutual, form-locking engagement.

3. The tarpaulin structure according to claim 2 wherein a first part of said roller-carriage chassis is formed by a sheet-metal shaped part gripping like a bracket around a runner of said upper longitudinal flange and supporting a supporting roller and a guide roller of said roller carriage, and wherein a second part of said roller-carriage chassis is formed by a sheet-metal folded part which grips, by means of free ends of the folded part, in a partial and tong-like manner around said first part of said roller carriage and engages, by means of an engagement region of U-shaped configuration in horizontal projection, in a hollow profile of said bow shaft.

4. The tarpaulin structure according to claim 3 wherein said second part of said roller-carriage chassis grips with a first arm over a profiled base of said first part of said roller-carriage chassis, and wherein said second part of said roller-carriage chassis grips with a second arm over a limb, which lies on the inside with respect to said folding top, of said first part of said roller-carriage chassis.

5. The tarpaulin structure according to claim 4 wherein said second part of said roller-carriage chassis is provided at free ends of said first arm and said second arm of the chassis with a respective bent-over edge, wherein said bent-over edge of said first arm engages with a slotted recess in said profiled base of said first part of said roller-carriage chassis, and wherein said bent-over edge of said second arm grips around a free edge of said limb of said first part of said roller-carriage chassis.

6. A tarpaulin structure for vehicle bodies and containers comprising:

a folding-top frame covering a length of a loading compartment and being supported on a vehicle chassis via protruding supports and having upper longitudinal flanges;

a tarpaulin which at least fits over a roof region of said folding-top frame, the tarpaulin being supported by a plurality of bows supported by means of a roller carriage in a manner allowing the bows to be displaced in the longitudinal direction on said longitudinal flanges, wherein two adjacent bows of said plurality of bows are connected to one another by means of a bearing element for said tarpaulin in such a manner that a reduction in a distance between said two adjacent bows results in an upwardly directed folding of said tarpaulin between said two adjacent bows;

wherein the roller carriage is connected via mutual, form-locking engagement to said bearing element, and wherein said bearing element connecting said adjacent bows and roller carriage to one another includes a strip of semi-rigid material resting with an end region partially on a bracket-shaped first part of a chassis of said roller-carriage and, at least in the longitudinal direction of said roller-carriage chassis, supported on regions, which are bent out upwards, of a profiled base of said first part of said roller-carriage chassis.

7. The tarpaulin structure according to claim 6 wherein said end regions of said bearing elements are gripped over by a first arm of a second part of said roller-carriage chassis.

8. The tarpaulin structure according to claim 7 wherein said bearing element is in form-locking engagement, by means of recesses formed in said end regions, with reliefs which are of complementary configuration are cut out from said profiled base and point upwards.

9. The tarpaulin structure according to claim 8 wherein a longitudinal edge region and a transverse edge region of said end regions are simultaneously and forcibly held in form-locking engagement, both in a longitudinal direction and in a transverse direction of said roller-carriage chassis, on said bent out portion of said profiled base by means of said first arm of said second part of said roller-carriage chassis.

10. The tarpaulin structure according to claim 3 wherein said engagement region of said second part of said roller-carriage chassis is secured in its engagement position in said hollow profile of said bow shaft by means of a spring plug which grips, by means of a plug pin, simultaneously through a recess in at least one angled portion of the a profiled limb of said engagement region, which angled portion at least partially grips over a region between two profiled limbs of said engagement region, and through hole recesses in mutually opposite profiled walls of said hollow profile.

11. The tarpaulin structure according to claim 1 wherein a multiplicity of hole recesses is provided in a longitudinal section, successively in a longitudinal direction thereof, of a hollow profile which forms the bow shaft, wherein a spring plug is assigned to said multiplicity of hole recesses.

12. The tarpaulin structure according to claim 1 wherein said bearing element can be folded around at least one marked line of articulation.

13. A folding top superstructure for one of a commercial vehicle body and a container, said superstructure having a chassis with a loading compartment, comprising a folding-top frame which covers the length of said loading compartment comprising supports protruding from said chassis and upper longitudinal flanges supported by said supports, a tarpaulin which at least fits over a roof region of said folding top frame, a plurality of bearing elements for said tarpaulin connecting mutually adjacent bows to one another in such a manner that a reduction in the distance between two adjacent bows results in an upwardly directed folding of said tarpaulin between said adjacent bows, said bows each comprising a bow shaft, and a roller carriage connected via mutual, form-locking engagement to at least one of both ends of each of said bow shafts in a manner allowing the bows to be displaced in a longitudinal direction of said longitudinal flanges, wherein a bearing element extends between two adjacent roller carriages and is connected to each of said bows exclusively via mutual, form-locking engagement.

* * * * *